United States Patent
Tartaglia et al.

(10) Patent No.: US 8,181,603 B2
(45) Date of Patent: May 22, 2012

(54) APPARATUS AND METHOD FOR CHANGING LABORATORY ANIMAL CAGES OR OTHER OPERATIONS

(75) Inventors: Giovanni Tartaglia, Varese (IT); Giovanni Frangelli, Caronno Varesino (IT)

(73) Assignee: Tecniplast S.p.A., Buguggiate (IT)

( * ) Notice: Subject to any disclaimer, the term of this patent is extended or adjusted under 35 U.S.C. 154(b) by 614 days.

(21) Appl. No.: 12/264,503

(22) Filed: Nov. 4, 2008

(65) Prior Publication Data
US 2010/0031894 A1   Feb. 11, 2010

(30) Foreign Application Priority Data
Aug. 8, 2008   (EP) ..................... 08425558

(51) Int. Cl.
*A01K 1/03* (2006.01)
(52) U.S. Cl. ......... 119/417; 119/427; 119/473; 119/481
(58) Field of Classification Search .................. 119/417, 119/421, 427, 452, 455, 473, 481, 501
See application file for complete search history.

(56) References Cited

U.S. PATENT DOCUMENTS

| | | | |
|---|---|---|---|
| 3,695,232 A * | 10/1972 | Frank | 119/455 |
| 3,731,657 A | 5/1973 | Alessio | |
| 5,048,459 A * | 9/1991 | Niki et al. | 119/418 |
| 5,996,535 A | 12/1999 | Semenuk et al. | |
| 6,308,660 B1 | 10/2001 | Coiro, Sr. et al. | |
| 6,553,939 B1 | 4/2003 | Austin et al. | |
| 2003/0051676 A1 | 3/2003 | Rivard | |
| 2004/0231611 A1 | 11/2004 | Gabriel et al. | |

FOREIGN PATENT DOCUMENTS

| | | |
|---|---|---|
| EP | 1616482 A2 | 1/2006 |
| EP | 1616482 A3 | 5/2006 |
| EP | 1719406 | 11/2006 |
| EP | 1719406 A1 | 11/2006 |
| EP | 1719406 B1 | 1/2008 |
| EP | 2087787 A2 | 8/2009 |
| EP | 2087787 A3 | 11/2009 |
| WO | WO0124618 | 4/2001 |
| WO | WO03096801 A1 | 11/2003 |

OTHER PUBLICATIONS

Unofficial European search report for corresponding European application 08425558.7.
An unofficial extended European Search Report for European patent application EP 0816483.9 corresponding to U.S. Appl. No. 12/265,747.

* cited by examiner

*Primary Examiner* — Yvonne Abbott
(74) *Attorney, Agent, or Firm* — LeClairRyan, a Professional Corporation

(57) ABSTRACT

An apparatus and method for changing laboratory animal cages wherein the apparatus includes at least one seat, of which receives a cage having a lid. The seat is provided with a mechanical system configured to pick and lift the lid.

11 Claims, 7 Drawing Sheets

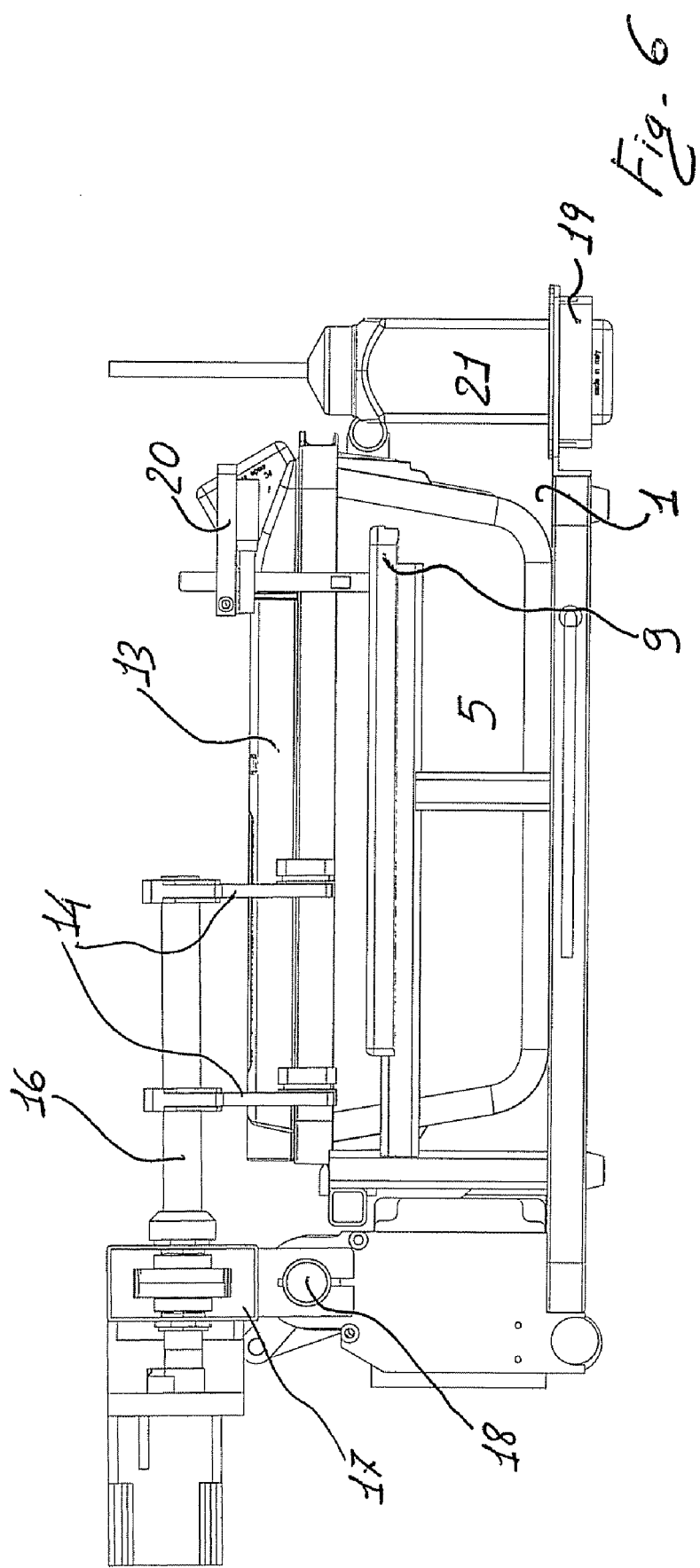

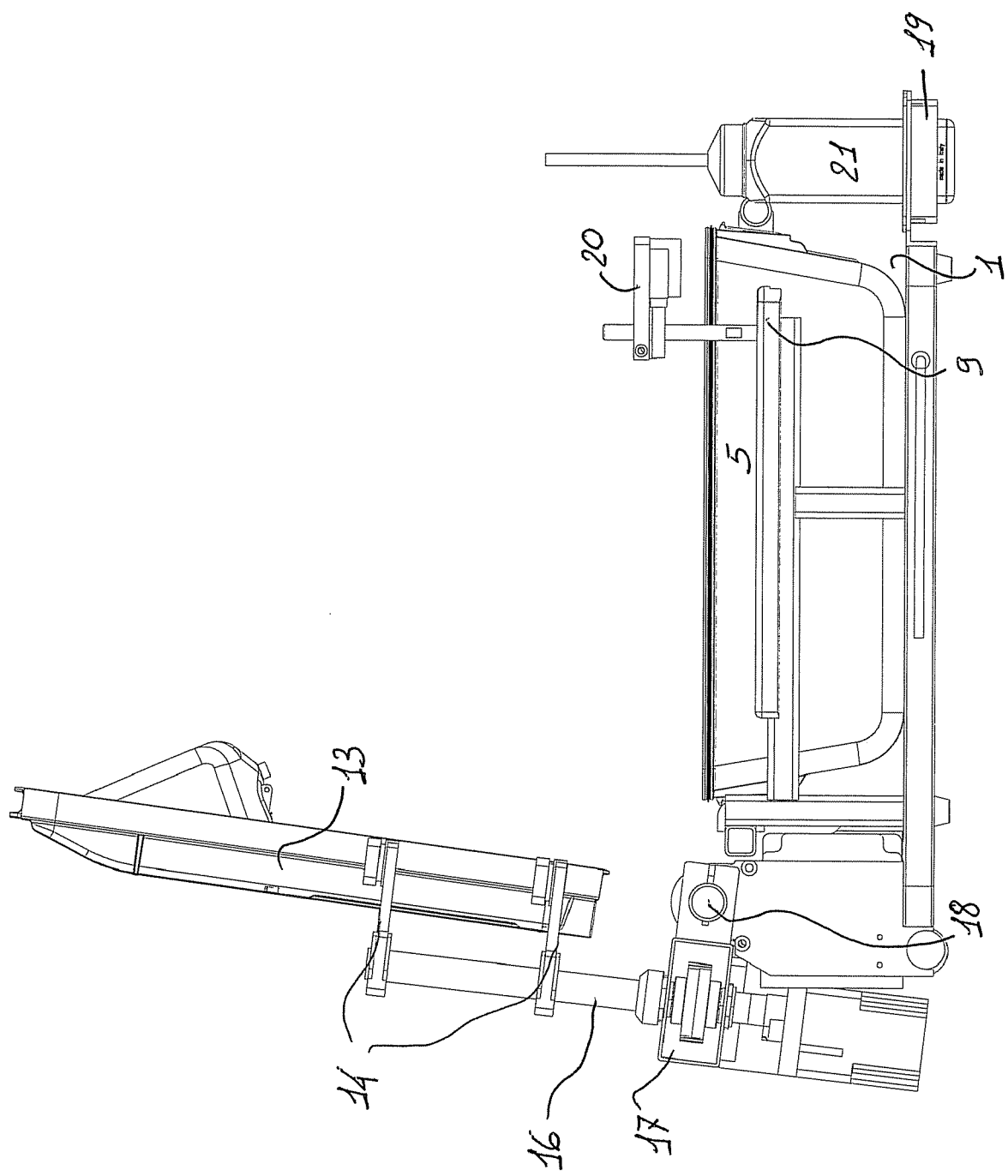

APPARATUS AND METHOD FOR CHANGING LABORATORY ANIMAL CAGES OR OTHER OPERATIONS

FIELD OF THE INVENTION

The present invention relates to an apparatus and method for changing laboratory animal cages, or for performing operations on a cage requiring accessibility or visibility inside the cage.

BACKGROUND AND SUMMARY

In the field of laboratory animal management, specifically that of small animals such as rats or guinea pigs, use is made of cages which must be kept in predetermined conditions, and generally with different degrees of isolation from the external environment, in order to prevent contaminations of the animals by the external environment and/or contamination of the environment and humans by the animals, if this event represents a danger. Use is made of cages which may be equipped with sealed closure, for example with a lid and a seal which may be provided on the lid or on the cage to make the coupling airtight. There are various lid fastening systems and may include brackets and hooks. The cages are generally provided with means for connecting to a ventilation system, for introducing filtered, decontaminated air and/or collecting air aspirated from the cages for the subsequent filtering and decontamination operations. The ventilation system provides for tubes generally on the racks on which the cages are positioned, with couplings adapted to couple with corresponding couplings provided on the cages when these are arranged in position on the rack. The cages have valves adapted to close when the cage is removed, to separate the inside from the outside. Similar systems are well known; a cage of the type indicated above is described, for example, in patent EP 1 719 406. The cages are provided with side guides to be inserted and supported by corresponding guides of the rack.

The cages must be periodically changed, moving the animals from a dirty cage to a clean one with a certain frequency and positioning the new cages on the rack.

This is performed manually. A possible procedure is as follows: the operator takes a cage in use from the rack, puts it on a working top, or better in a protected structure, for example a laminar flow changing cabin which, in virtue of appropriate air flows, prevents the contamination of cage interiors and of humans when the cages are opened. The operator also puts a clean cage on the top and opens the cages being careful not to touch the inside of the lids and to place the lids upside down on the working top; in order to avoid the contamination, the lids must also be positioned in zones not invested, for example, by the barrier air flow, which is possibly contaminated external air. At this point, the operator disinfects his or her hands, moves the animals, and then closes the cages and puts them onto the corresponding racks. Furthermore, before opening the cage, the drinking bottle must be removed and reintroduced in the new cage, if the type of cage makes the bottle accessible from the outside for being introduced or removed, as in the cages described for example in EP 1 719 406.

It is easy to understand that an operation of such type, repeated on large numbers of cages, implies long times, greatly depending on the operator's ability and on his or her psychophysical condition. There are many possibilities of making errors with a possible contamination of the animals, and of the environment outside and inside the cages, and the fatigue that derives therefrom is quite considerable for the operator, to the extent that many operators complain of cramps or similar disorders, or may even suffer personal injury, which may be translated into forced leave of absence following the physical fatigue. The problems may be worsened by the fact that a seal is interposed between the cage and the lid, which can cause sticking phenomena and a little difference of pressure may occur between the outside and the inside, which may increasingly complicate a repetitive, fluid operation.

The above-described problems have now been solved by an apparatus for changing laboratory animal cages having a lid, the apparatus including at least one seat, preferably at least two seats, each of which for receiving a cage having a lid; the seat being provided with means for picking and lifting the lid.

According to a possible aspect of the invention, devices for detecting the presence of cages in the seat(s) may be provided.

Preferably, the detecting means may be part of a system for enabling the operation of the lid lifting means, system which may alternatively or additionally include other elements, such as enabling devices actuated by the operator.

According to a preferred aspect, the picking and lifting means may also be used for repositioning the lids on the cage.

Preferably, the seat is adapted to withhold the cage in position when lifting the lid, and specifically has means adapted to prevent the lifting of the cage along with the lid.

Preferably, the apparatus is adapted to be used with cages having a removable lid, preferably adapted to be sealed onto the cage and with a locking and releasing mechanism of the lid. The apparatus preferably include means for unlocking the aforesaid mechanism.

The seats may be more than two; according to a particularly preferred aspect of the invention, there are four seats.

The invention further relates to a corresponding method for changing cages.

The apparatus, despite being designed for changing cages, is further adapted to perform operations other than cage changing, which require to open the cage, specifically cleaning operations or operations on the content of the cage, such as experimenting, checking or other operations. In such a case, an apparatus with a single seat may also be particularly indicated, notwithstanding that only one seat of an apparatus with several seats may be used, or several cages may be parallelly treated on a multiple seat apparatus.

BRIEF DESCRIPTION OF THE DRAWINGS

The present invention will now be disclosed by means of the detailed description of preferred, but not exclusive embodiments provided only by way of mere example, with the aid of the accompanying drawings in which:

FIGS. 6 and 7 show side views of the apparatuses shown in FIGS. 1 and 2.

DETAILED DESCRIPTION

Figure 1:
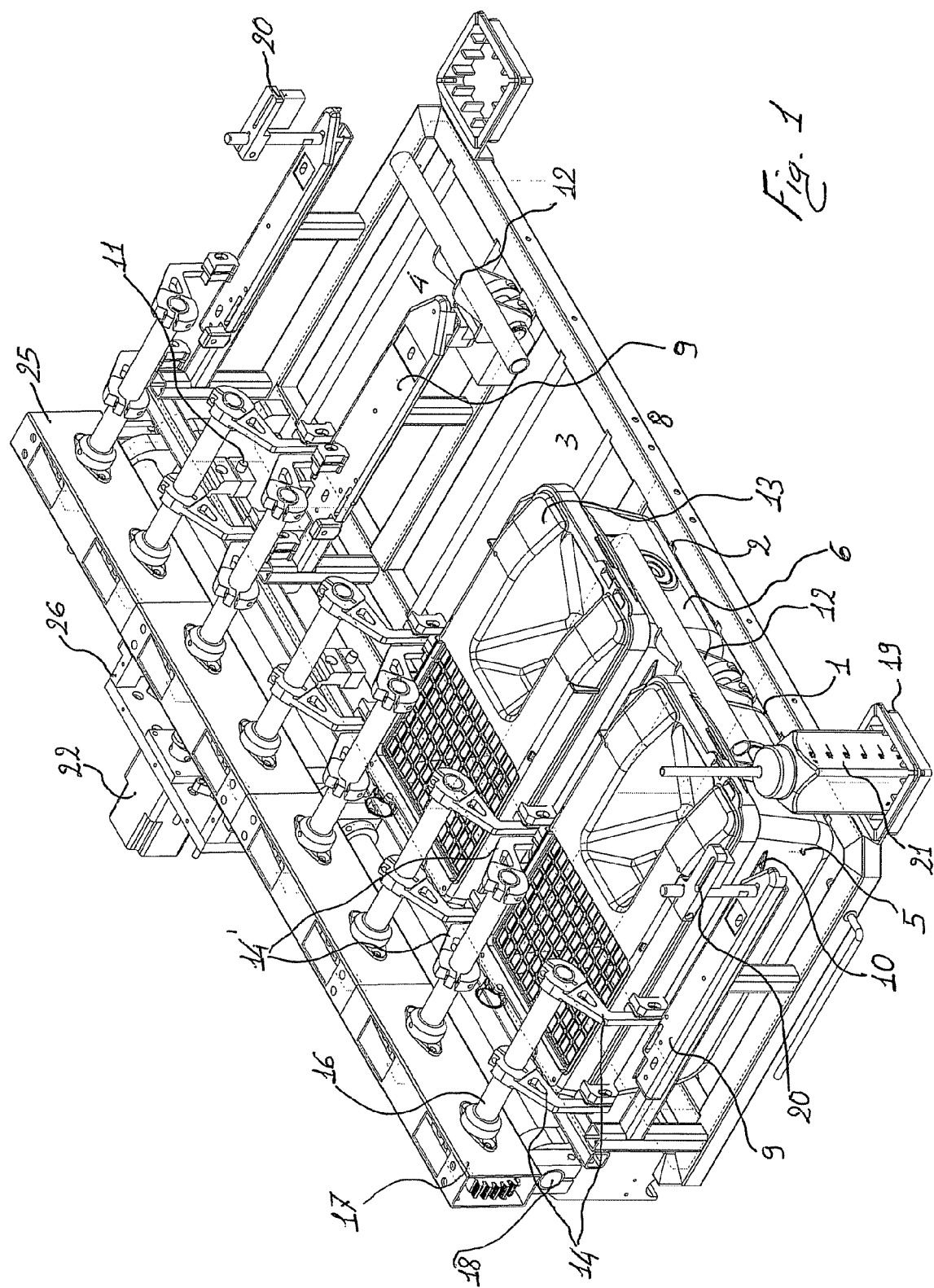
FIG. 1 diagrammatically shows a perspective view of an apparatus according to an aspect of the invention, with a pair of cages inserted.

FIGS. 1 and 6 show an apparatus according to the present invention. In the example shown, the apparatus includes four seats 1, 2, 3 and 4, the first two of which are shown filled with the cages 5 and 6, the others are shown empty for convenience. The apparatus may either be part of or be introduced into an either fixed or movable cage changing station, which may be provided with devices for preventing the contamination, for example a laminar flow cabin of known type, in which appropriately distributed air flows avoid the contamination between a working volume, where the cages opening and closing and other operations are performed, and the surrounding environment.

The exemplified apparatus is adapted to be used with cages described in patent EP 1 719 406. The cages are sealed with respect to the external environment by a closure system which includes two latches at the ends of the cage, adapted to engage a slot of the lid and to release it when pressed. It should be noted that cages of this type have a sealing system adapted to ensure the isolation without requiring the compression of the seal. Therefore, the latches only act to prevent the removal of the lid and the seal does not need to be compressed to be able to close them. Similar cages may be used or an apparatus may be constructed by modifying the various elements to adapt to the peculiarities of other types of cage.

The apparatus may include a top 7 on which the other structures are mounted. Each seat is adapted to receive a cage, which may be inserted from the front part 8, with an essentially horizontal movement. Means for withholding the cages may be the longitudinal guides 9, adapted to engage the longitudinal matching members 10 of the cages, which are commonly provided on the cages of this type, to support them on the corresponding rack guides. In this case, the guides of the apparatus may engage the matching member, not necessarily to support it, but in a manner to prevent the lifting of the cage with the lid when the latter is lifted, thus solving problems which may derive from sticking of the seal or possible vacuum inside the cage.

The matching members 11, placed in the seats, are adapted to engage one of the latches, specifically the rear latches placed at the ends of the cages, causing the release thereof. Obviously, the releasing means may be different, in the case of different types.

Figure 3:
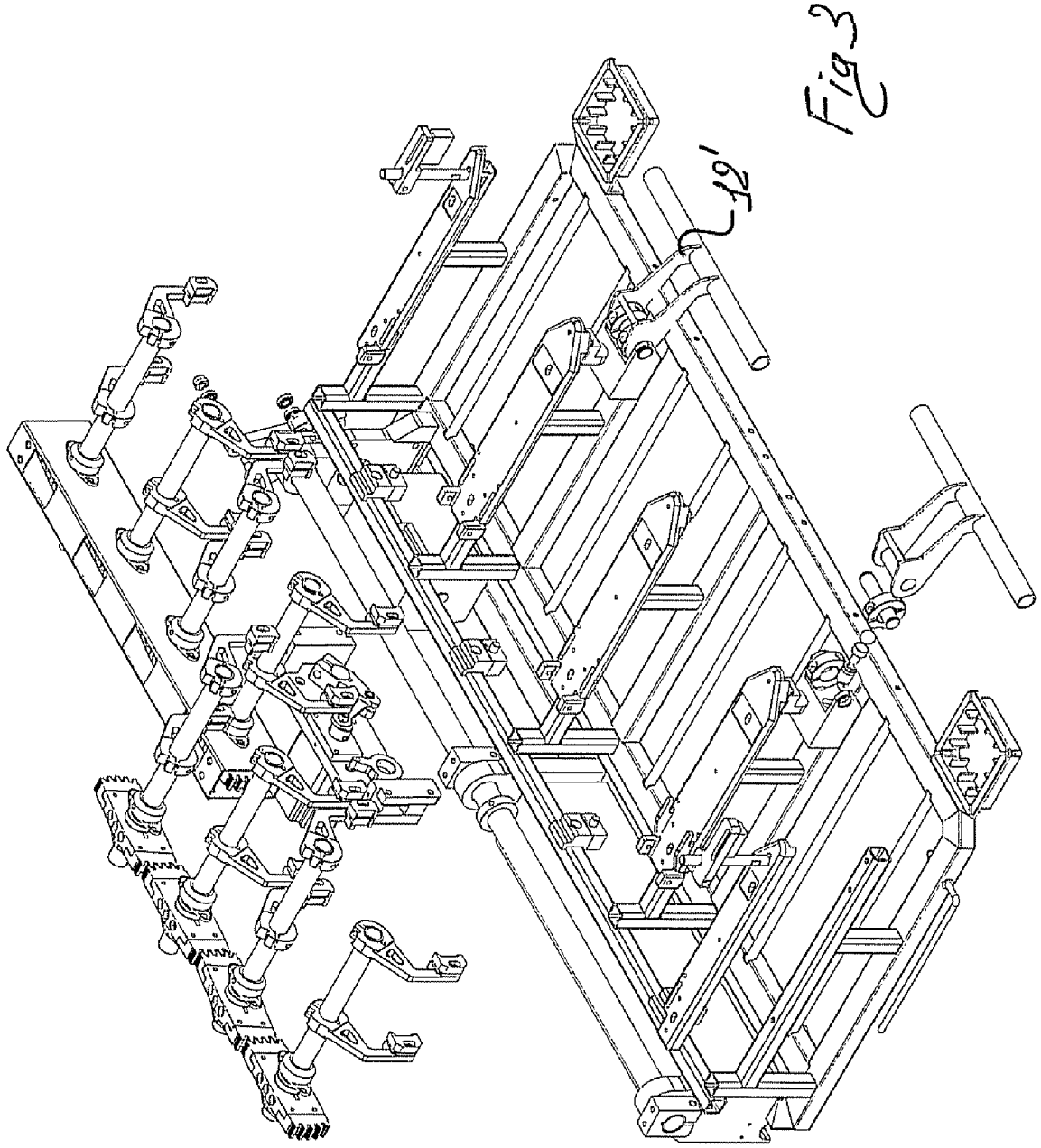
FIG. 3 diagrammatically shows an exploded view of the apparatus in the preceding figures.

The levers 12 are placed in the front. Each lever may concern two seats, or one lever per seat may be provided; it is worth noting that, according to an aspect of the invention and as will be explained below, the levers of all positions are reciprocally integral and, in this case a single lever might be provided. In order to allow inserting and extracting the cages, the lever may take the lowered position, in which the lever 12' is shown in the exploded view in FIG. 3. The end of the levers may be adapted to engage the other latch of the cages. By lifting the lever when inserting the cage, the lid is thus free and may be lifted.

Figure 2:
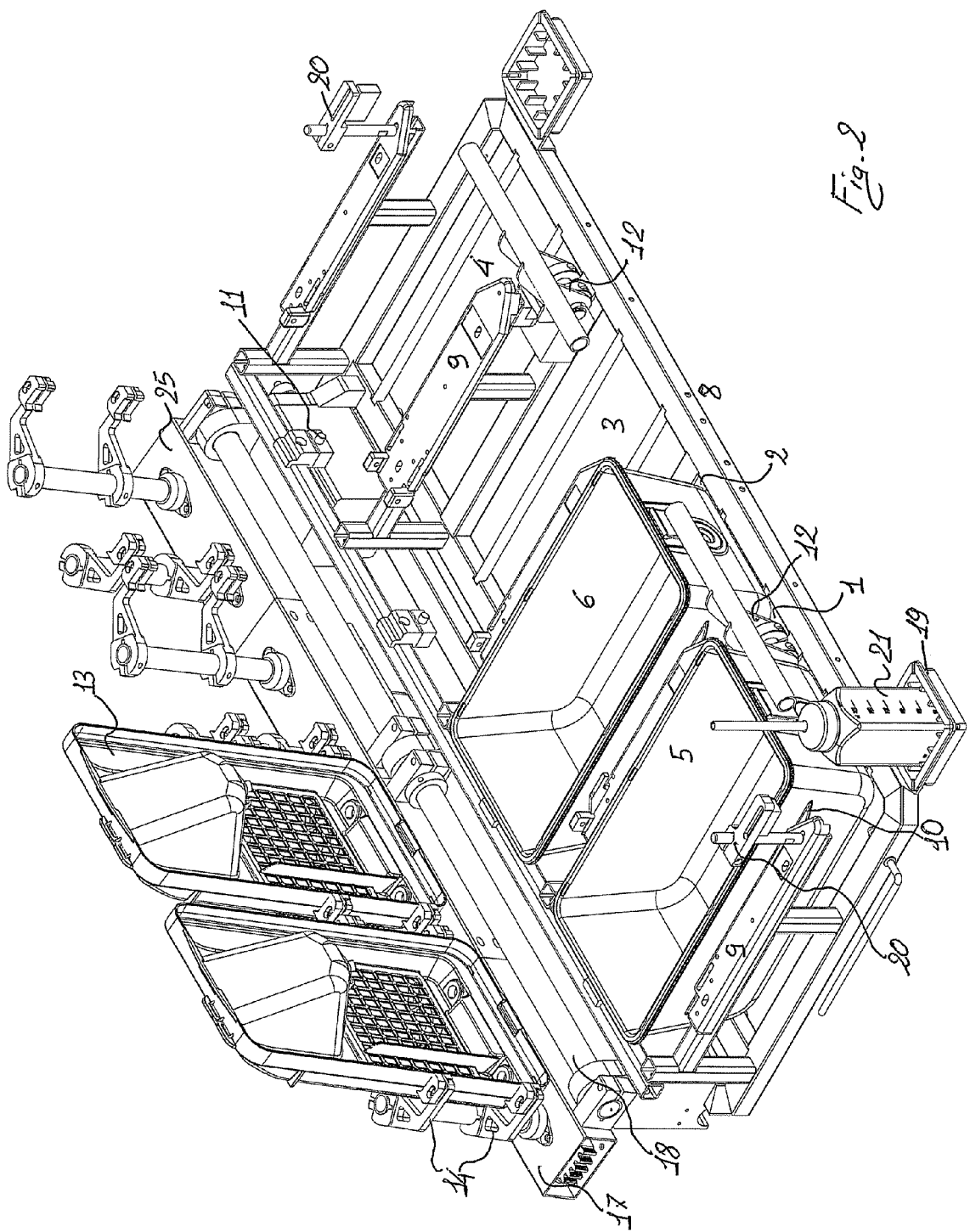
FIG. 2 diagrammatically shows a perspective view of the apparatus in FIG. 1 after the lids have been lifted.

Means for picking and lifting the lids 13 may include arms 14, 14', having ends 15 adapted to engage the edge 16 of the lid of a cage. In this case, the edge of the lid hangs over the edge of the cage and may be therefore easily gripped by mechanical systems. The arms may be opposite in pairs, such as each of the arms 14 with respect to the arms 14'. Two pairs of arms per lid may be sufficient for picking. The arms may be mounted to a pair of shafts 16 and 16', which may rotate in the opposite direction. In this manner, the arms will go to an engaging position with the edge of the lids in one direction, and will release it in the opposite direction. The rotation of the lifting mechanism 17 which supports the shafts 16 and 16' about the axis 18 will take the apparatus to the configuration in FIGS. 2 and 7. The cages will be kept in the indicated position and the latches will be kept open by the matching members and by the levers. In this manner, the content of the cages is accessible for the changing operations. Obviously, the apparatus is such to allow the closing of the arms, for picking the lid and lifting it when the arms are closed. An enabling control which may be a pedal, according to a preferred aspect of the invention, will allow the operator to control the lowering of the arms after the change, thus returning the lids onto the cages. The lifting means are thus also means for closing the cages. The levers may either automatically return to the opening position by means of a specific mechanism, or may be lowered by the operator for the removal of the cages. This allows the latches engaged by the ends of the levers to return to the locking position of the lids. The latches engaged by the matching members will do the same as soon as the cages start to be removed from the seats. The contact of the operator's hands with the exterior of the cages and the possibility of errors are thus minimized.

If the cages have a seat in the lid for the insertion of bottles, as in the used cages, such as those described in the mentioned European patent, it may be necessary to remove the bottle before lifting. Specific sensors of any appropriate type may be provided, to ensure that this operation is performed and that no bottles are in any cages. For example, since the bottles protrude from the lid in the cages of the exemplified type, an optical sensor can be made and positioned on the supports 20, including a source and a detector of an appropriate radiation arranged on opposite supports. The source and the detector are arranged so that any bottle present on a cage and inserted into any of the seats would interrupt the optical path of the radiation, thus detecting the presence of the bottle. The detection by means of the sensor may be used to prevent the actuation of the lifting means until all the bottles have been removed. A bottle holder 19 may be provided to allow the operator to rest the bottle 21 during the operations. In general, one bottle holder every two positions may be sufficient, considering that in cage changing the same bottle is usually passed from the dirty cage to the clean cage without requiring any replacement, which may easily occur at other times, also without removing the cage from the rack.

Figure 4:
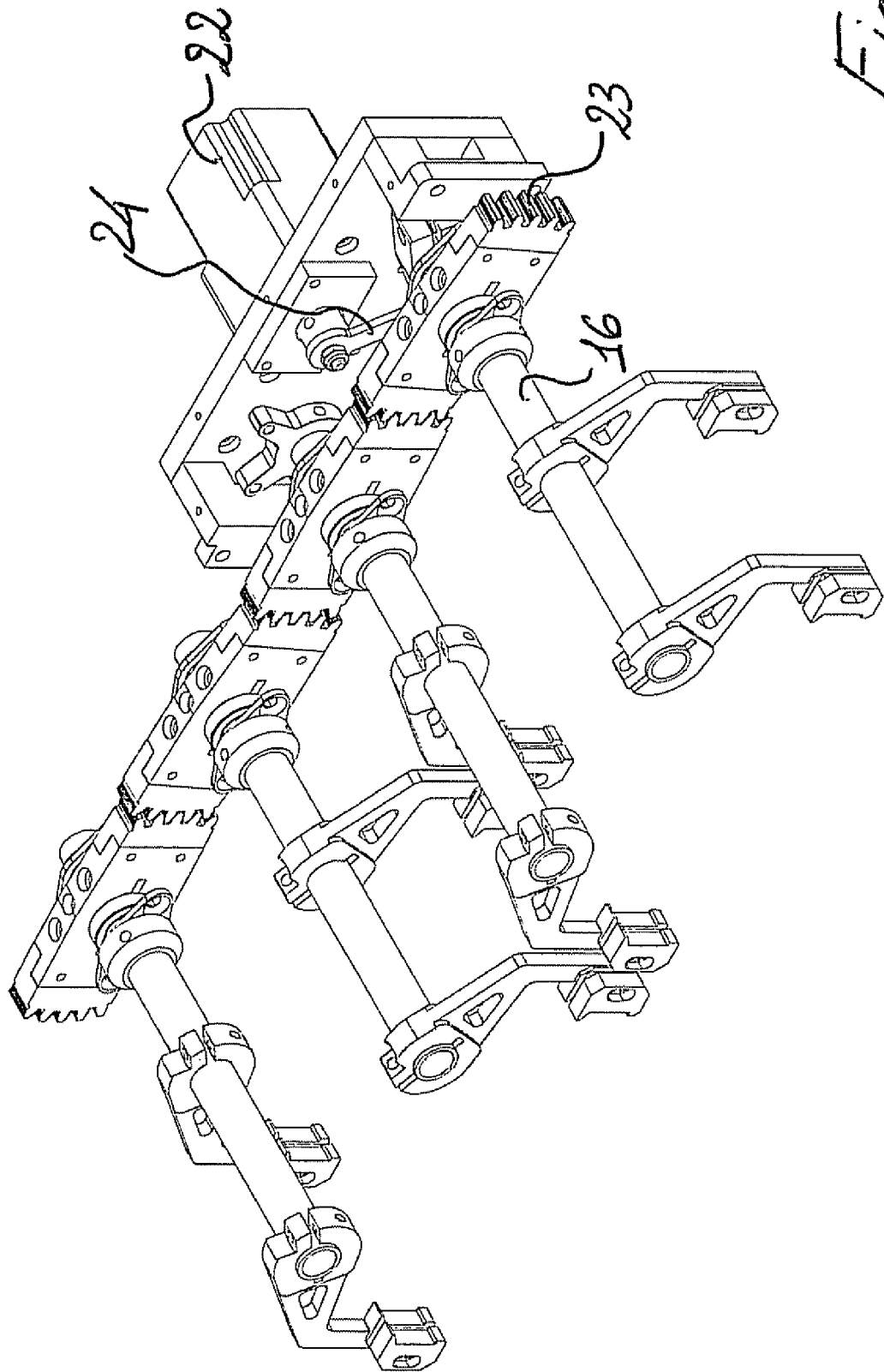
FIGS. 4 and 5 diagrammatically show details of the picking and lifting means.
Figure 5:
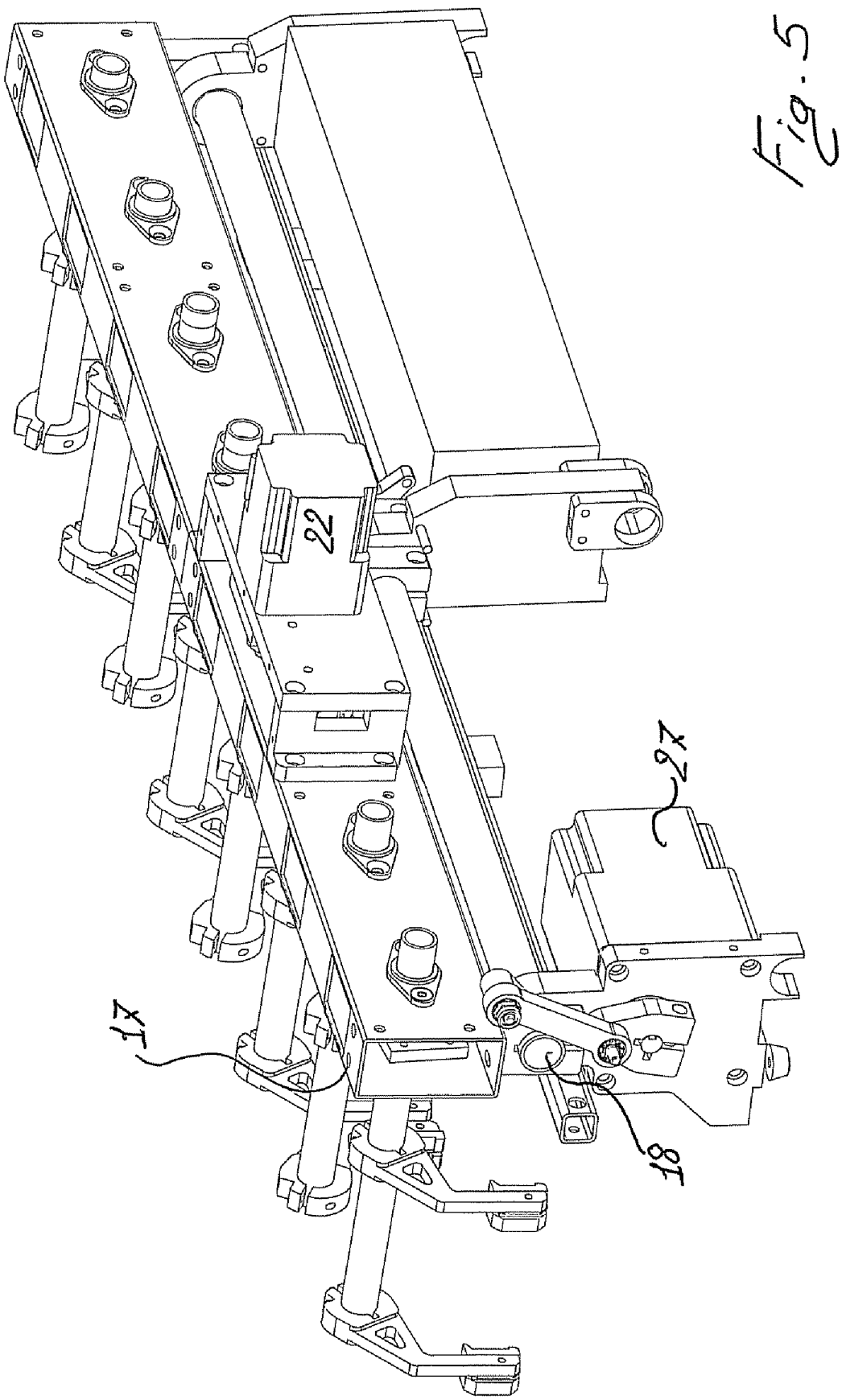

The lifting mechanism, having the features outlined above, may be made by a person skilled in the art and, according to a possible aspect of the invention, may be electrically actuated. For example, the motor 22 may be used to move the arms by means of the shafts. The motor imposes the rotation to a shaft, connected by means of a series of gears to all the shafts of the apparatus, eight in the case of four seats; FIG. 4 shows an example of kinematic mechanism: four shafts are shown: Each shaft 14 is integral with the gear portion 23, which meshes the gear portion of the adjacent shaft, which moves in a synchronous, counter-rotating manner with respect to the adjacent shaft. One of the shafts is driven by the motor 22 by means of the lever 24, appropriately and eccentrically hinged to the end of the shaft. The shafts and the motor are supported by the casing 25, as shown in FIG. 1. The carter contains the gear portions. The bracket-like support 26 protects the moving parts. The motor, preferably electric, may be of various types, e.g. a stepper motor, with the possibility of turning in both directions. According to a preferred aspect, the same motor may acts to move the shafts 14, as seen, and in sequence, by means of a mechanism which may be easily worked out by a person skilled in the art, to make the lifting mechanism 17 rotate, along with casing, shafts and motor, about the axis 18, or, as shown for example in FIG. 5, a second motor 27, synchronized with the motor 22, by means of electronic or mechanical control, or in another appropriate manner, provides for such a movement, by means of the connecting rod 28 hinged to the lifting mechanism 17 and eccentrically to the shaft of the motor 27. Other handling structures may be created.

Preferably, the apparatus is adapted to perform the closing of the arms and the subsequent lifting, for example following the lifting by the operator of the levers 12, a step of stopping until a command, as seen above, is imparted by the operator; the descent of the arms and the opening thereof follow. As mentioned, at this point the levers 12 may be either automatically lowered or manually opened.

If deemed appropriate, further movements may be provided. For example, once the arms are opened, there may be an upward stroke of the open arms to clear the space on the cages for further operations. In such a case, a lowering stroke will be provided before closing and lifting. However, this is not necessary in the exemplified configuration.

The opening and closing of the arms allows a very accurate picking of the lids and is deemed advantageous. However, given the insertion mode of the cages in the seats, it is possible to suppress such a movement by providing the arms with ends able to interact with the edges of the lids for lifting, edges which can be inserted directly into such ends, thus simplifying the apparatus.

A possible method of changing cages with the exemplified apparatus includes: inserting a cage to be replaced, containing the animals, for example taken from the rack, and a clean cage in two seats of the apparatus; lifting the lids upon enabling by the operator; transferring the animals from the dirty cage to the clean cage; lowering the lids upon enabling by the operator; and/or removing the cages which can be placed where desired.

In the case of four-seat apparatus, like the one shown in the example, and in greater detail, the operations may be performed as follows.

A dirty cage and a clean cage may be positioned in the seats 1 and 2; if present, the operator removes the bottle from the dirty cage placing it on the bottle holder; the operator lifts the levers 12, releasing the latches of the cages and enabling the lifting; the apparatus closes the arms, which grip the lids, and then lifts them, as seen above. During this step, the operator may disinfect his or her hands if necessary, which is usually required. At the end of the lifting, with the apparatus in the configuration in FIG. 2, the operator may manually transfer the animals. By means of a control, for example a pedal-operated control, the operator allows the descent of the mechanism with the lids, and the subsequent opening of the arms; the operator may lower the levers 12 or these may be lowered automatically; the operator inserts the cages into the seats 3 and 4; the operator may now introduce the bottle into the clean cage and remove the first pair of cages to be places in an appropriate position and remove the bottle from the dirty cage which has just been inserted. By lifting the levers 12, the cycle is repeated for the new pair of cages, with the seats 1 and 2 free and ready to be used for the next cycle with a similar sequence.

It has been found that the formulated sequence limits the error possibility and speeds up the operations, reducing the operator's physical and mental fatigue. The precise timing allows facilitating operations such as disinfections. The removal of the bottles is ensured if the exemplified sensors are present.

As mentioned, the apparatus may be used for operations other than cage changing, in which opening and, normally, closing the cage is required. Such operations may relate to cage cleaning, maintenance, checks and experiments on the animals or handling, picking and/or introducing material contained in the cage. In such a case, at least one cage is inserted into a seat of an apparatus according to the invention, lifting the lids by means of enabling by the operator; performing the operations which require accessibility or visibility from the inside of the cage; lowering the lids, upon operator's enabling; removing the cages from the seat.

A further use of the apparatus is to separate the animals contained in a cage and divide them among two or more cages, for example to separate parents from offspring or separate brothers or other similar operations commonly referred to as "breeding".

If cages of a type other than that exemplified are used, devices of other type may be required. If the seal of the cages needs to be compressed by the lid by closing, for example, additional movements of the mechanism will be needed to allow to unlock and lock the latches, which should be synchronized with the movement of the arms by means of appropriate mechanisms.

A single seat might also be provided. In this case, several apparatuses should be preferably provided, or the change would be performed by manually handling a cage (e.g. the dirty one), or by moving the animals into a provisional container while the cage is being replaced on the apparatus.

Other variants may be worked out from what above described.

The invention claimed is:

1. An apparatus for changing laboratory animal cages having a lid, the apparatus including:
   at least one seat for receiving a cage having a lid;
   a locking and releasing mechanism of said lid;
   a mechanical system configured to pick and lift the lid; and
   an unlocking mechanism, wherein said locking mechanism includes two latches on the opposite sides of the cage and said unlocking mechanism include a matching member in said seat, adapted to engage one of the latched and one or more levers adapted to withhold the cages in the at least one seat, the levers having an end adapted to engage the other latch.

2. The apparatus according to claim 1, wherein the mechanical system configured to pick and lift may also be used to reposition the lids on the cages.

3. The apparatus according to claim 2, being configured to operate with the cages which have a sealing system to ensure the isolation without requiring to compress a seal interposed between the lid and the body of the cage.

4. The apparatus according to claim 1, being configured to operate with cages having in the lid a seat for a bottle and a sensor device to detect the presence of the bottle, wherein the presence of the bottle in the seat of the lid of a cage placed in a seat of the apparatus prevents said mechanical system configured to pick and lift from moving.

5. The apparatus according to claim 1 having four seats.

6. The apparatus according to claim 1, wherein said mechanical system configured to pick and lift includes one or more electric motors.

7. The apparatus according to claim 1, including an enabling system to enable the mechanical system to pick and lift the lids, and an enabling system to enable the mechanical system to lower and release the lids which may be actuated by an operator.

8. A method for performing operations on laboratory animal cages having a lid by the apparatus according to claim 1 the method comprising;
   lifting and lowering the lids by the apparatus upon enabling by an operator.

9. An apparatus, for changing laboratory animal cages having a lid, the apparatus including:
   at least one seat, for receiving a cage having a lid; said seat being provided with a mechanical system configured to pick and lift the lid; wherein said apparatus is adapted to operate with cages having longitudinal matching members, including longitudinal guides adapted to engage said matching members to prevent the cage along with the lid from lifting.

10. An apparatus for changing laboratory animal cages having a lid, the apparatus including:
at least one seat, for receiving a cage having a lid; said seat being provided with a mechanical system configured to pick and lift the lid; wherein said mechanical system configured to pick and lift includes, for each seat, one or more pairs of arms, having ends adapted to engage the edge of the lid, mounted to two reciprocally counter-rotating shafts.

11. The apparatus according to claim 10, including a lifting mechanism adapted to support said shafts and able to rotate about an axis for causing the shafts and said arms to lift.

* * * * *